US006771963B1

(12) United States Patent
Cheng et al.

(10) Patent No.: US 6,771,963 B1
(45) Date of Patent: Aug. 3, 2004

(54) TRIGGERING HANDDOWNS AND HANDOFFS OF MOBILE STATIONS BETWEEN BORDERING CELLS OF CELLULAR WIRELESS COMMUNICATION SYSTEMS

(75) Inventors: Terry Si-Fong Cheng, Singapore (SG); Ching Huang, Randolph, NJ (US); Yuen-Yin L. Koo, Morristown, NJ (US); Shen-De Lin, Morris Plains, NJ (US); Carl Francis Weaver, Hanover Township, Morris County, NJ (US); Wen-Yi Kuo, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/135,191

(22) Filed: Aug. 17, 1998

(51) Int. Cl.[7] ............................................... H04Q 7/20
(52) U.S. Cl. ..................... 455/437; 455/438; 455/440; 455/442; 370/332
(58) Field of Search ............................... 455/436, 437, 455/438, 439, 440, 442, 443, 444, 522; 370/331, 332, 333, 334

(56) References Cited

U.S. PATENT DOCUMENTS

| 5,285,447 | A | * | 2/1994 | Hulsebosch | ................. | 370/332 |
| 5,623,535 | A | * | 4/1997 | Leung et al. | ................ | 455/444 |
| 5,640,414 | A |   | 6/1997 | Blakeney, II et al. | ....... | 375/200 |
| 5,917,811 | A | * | 6/1999 | Weaver, Jr. et al. | ........ | 370/332 |
| 5,926,470 | A | * | 7/1999 | Tiedemann, Jr. | ............ | 370/334 |

FOREIGN PATENT DOCUMENTS

| GB | 2313740 A | 12/1997 | ............ | H04Q/7/38 |
| WO | WO 93/06683 | 4/1993 | .......... | H04M/11/00 |
| WO | WO 95/31880 | 11/1995 | ............ | H04Q/7/38 |

OTHER PUBLICATIONS

Stellakis, H et al. CDMA to AMPS Handdown Strategies in a Dual–Mode Cellular Network, ICT '98—International Conference on Telecommunications. Bridging East and West Through Communications, Proceedings of ICT '98—International Conference on Telecommunications, Chalkidiki, Greece, Jun. 21, 1998, pp. 96–100, vol. 4, XP–000889723, 1998, Thessaloniki, Greece, Aristotle Univ.

* cited by examiner

*Primary Examiner*—Erika Gary
*Assistant Examiner*—Temica M. Davis
(74) *Attorney, Agent, or Firm*—Julio A. Garceran

(57) ABSTRACT

A procedure for triggering a handdown or a handoff a mobile station served by a base station of a cellular wireless communication system. A tolerable path loss for signal links between the base station and a mobile station located within the base station's cell, is initially determined. A control signal is radiated at a known transmit power level from the base station over its cell. A receive power level threshold is determined for the control signal for reception by the mobile station, according to the transmit power level and the tolerable path loss. A handoff of the mobile station is triggered after deriving the received power level of the control signal at the mobile station, and determining that the received power level is less than the receive power level threshold. In one embodiment, a mobile station reports to a serving base station only after the former determines that the received power level of a control signal from the base station is less than a threshold level initially provided to the mobile station by the base station. The procedure is applicable, e.g., to base station cells of a first CDMA cellular system which cells border on cells of an analog (AMPS) or a second CDMA cellular system.

34 Claims, 4 Drawing Sheets

TRIGGERING HANDDOWNS AND HANDOFFS OF MOBILE STATIONS BETWEEN BORDERING CELLS OF CELLULAR WIRELESS COMMUNICATION SYSTEMS

BACKGROUND OF THE INVENTION

1. Field of the Invention

This invention relates to handdown and handoff procedures for mobile stations traveling between adjacent or overlapping cells of wireless communication systems. In particular, the invention provides handdown and handoff procedures which are triggered on the basis of propagation path loss between a mobile station and a base station currently serving the mobile station.

2. Discussion of the Known Art

In addition to signals carrying voice traffic, a base station of a cellular wireless communication system transmits at least one control signal at a known power level over its geographic area of coverage or "cell". For example, a base station of a code-division multiple access (CDMA) system radiates a steady pilot signal having a repetitive pseudo random binary sequence code. The pilot signals of all base stations of a given CDMA system have the same binary sequence code, but have different time offsets relative to a zero time reference. When received by a mobile station, the pilot signals allow the mobile station to obtain initial system synchronization, and to link with a system base station whose received pilot signal is strongest among other received pilot signals. The pilot signal also provides a code that the mobile station uses to decode other signals from the system base stations, namely, synchronization (sync), paging, and traffic channels.

Base stations of a time-division multiple access (TDMA) system and of a frequency-division multiple access (FDMA or "analog") system, also transmit steady control signals at known power levels to mobile stations traveling in the base station cells over forward control frequency channels. In TDMA systems such as, e.g., American Digital Cellular (ADC), the global system for mobile communications (GSM), and Japanese digital cellular (JDC), such signals include synchronization (SYNC), slow associated control channel (SACCH) and digital verification color code (DVCCH) signals. In analog systems such as, e.g., the advanced mobile phone system (AMPS), each base station transmits a continuous supervisory audio tone (SAT) control signal for reception by mobile stations in the base station's cell. See generally, R. C. V. Macario, Cellular Radio Principles and Design (McGraw-Hill 1993); and R. Kuruppillai, et al., Wireless PCS (McGraw-Hill 1997).

In typical cellular wireless communication systems, a mobile station within a system cell is linked by a serving base station for two-way communication with a public switched telephone network (PSTN) or mobile switching center (MSC). The system base stations are themselves connected by wire to the mobile switching center. The MSC interfaces user traffic over wireless links between the base and the mobile stations, with the wired PSTN. An important function of the MSC is to ensure that a mobile station's link with the PSTN meets a minimum quality standard as the mobile station travels and signaling (i.e., propagation) conditions between the mobile station and the serving base station vary accordingly. The MSC will therefore operate to switch a mobile station to service by another base station, whenever a quality link with a currently serving base station becomes impossible to maintain.

If a mobile station is being served by a first base station affiliated with a first communication system (e.g., a CDMA system using a first set of frequency channels (F1)), and that base station's cell borders on a cell of a second base station affiliated with a second communication system (e.g., FDMA such as Advanced Mobile Phone System or AMPS, or CDMA using a different set of frequency channels (F2)), a "hard" handoff of the mobile station to service by the second base station must occur as the mobile station approaches the latter and moves out of range of the first base station. Otherwise, the mobile station will lose its link with the PSTN (a so-called "dropped" call). A hard handoff can be carried out directly, i.e., the mobile station is switched over directly for service by the second base station; or indirectly via an intermediate "handdown" procedure wherein the currently serving base station begins to serve the mobile station using the operating protocols of a second communication system (for example, the serving base station hands the mobile station down from CDMA to AMPS).

In CDMA systems, a known method of determining when a hard hand-off or handdown is necessary involves measuring received pilot signal strength in the form of a ratio Ec/Io at the mobile station, wherein Ec is received pilot signal power and Io is total received signal power at the mobile station, and initiating a hard handoff or handdown when the measured Ec/Io ratio falls below a set threshold. Currently, CDMA mobile stations measure Ec/Io and transmit a corresponding pilot strength measurement message (PSMM) based on the Ec/Io measurements to a serving base station, either in response to pilot strength measurement request orders (PMROs) from the base station, or if certain handoff trigger thresholds are met. Although CDMA base stations periodically request PSMMs from mobile stations they currently serve, such requests and the responses usually do not result in handoffs of the mobile stations. These ongoing signal exchanges occur irrespective of whether or not the trigger threshold is met, and increase processor loading of the system infrastructure thus tending to degrade the voice quality of existing calls.

Using Ec/Io measurements to trigger a handdown and/or handoff incur the following problems, however.

1. The total receive power Io at the position of the mobile station is a function of cell loading, which condition typically varies over time. Using a trigger threshold based on the Ec/Io ratio at the mobile station thus makes the threshold sensitive to the current traffic load condition at the serving base station. Accordingly, a handoff trigger based on received Ec/Io does not accurately reflect the ability of the serving base station to sustain a quality voice link with a given mobile station.

2. Using set handoff or handdown trigger thresholds based on Ec/Io can cause a handoff either too soon or too late, because the Ec/Io measurements with which the thresholds are compared vary depending on traffic loading of the system. Setting the thresholds too high will cause a handoff to be initiated too soon when the mobile station travels inward (i.e., toward) the serving base station, while setting these thresholds lower can seriously delay a handoff or handdown as the mobile station moves farther into the bordering cell of the second communication system. Also, triggering a handoff or handdown too early causes the base station cell to reduce its traffic capacity unnecessarily. On the other hand, a late handoff or handdown impairs the quality of an existing voice link.

3. In an analog system such as AMPS, a typical base station covers less area than a typical CDMA base station. In the region of a strong CDMA pilot signal due to light traffic load, the pilot coverage for a CDMA base station is expanded because the received Ec/Io ratio at the mobile station increases. Thus, if the base station attempts to handdown the mobile station for AMPS service by the same base station in such a region, then the call may be dropped because the station's AMPS coverage is too small when compared to its CDMA pilot coverage.

SUMMARY OF THE INVENTION

A scheme is provided for triggering a handoff or a handdown of a mobile station served by a base station in a cellular wireless communication system. Propagation path loss for signal links between the base station and the mobile station is used to trigger a handoff or a handdown. For example, the scheme can include determining a tolerable path loss for signal links between the mobile and the base stations, and radiating a control signal at a known transmit power level from the base station over its associated cell. A receive power level threshold for the control signal is determined for the mobile station, according to the known transmit power level of the control signal and the tolerable path loss. A handdown or a handoff of the mobile station is triggered after deriving the received power level of the control signal at the mobile station, and determining that the received power level is less than the receive power level threshold.

According to another aspect of the invention, a method of triggering a handdown or a handoff of a mobile station served by a base station of a cellular wireless communication system, includes receiving, at the mobile station, a control signal transmitted at a known power level from the base station, and a receive power level threshold for the control signal which threshold corresponds to the known transmit power level of the control signal and a tolerable path loss for signal links between the mobile and the base stations. A handdown or a handoff of the mobile station is triggered after the mobile station derives the received power level of the control signal, and determines that the received power level is less than the receive power level threshold.

For a better understanding of the invention, reference is made to the following description taken in conjunction with the accompanying drawing and the appended claims.

DETAILED DESCRIPTION OF THE INVENTION

As used herein, the term "handdown" is defined to include a procedure wherein a mobile station being served by a first base station using a first multiple access system, such as CDMA (F1), of a first wireless communication system, is handed down for service by the first base station but using frequency channels and/or signaling protocols of a second multiple access system. Additionally, in certain embodiments, the second multiple access system corresponds to a second base station of a second wireless communication system whose cell borders or overlaps the cell of the first base station. Moreover, the second base station of the bordering cell can belong to a service provider different from the provider of the first base station.

The term "handoff" is defined herein to include a procedure wherein a mobile station being served by a first base station is handed over for service by a second base station whose cell borders or overlaps the cell of the first base station.

The following considerations are made in defining a trigger for initiating a handdown or a handoff of a mobile station:

I. The trigger is defined on the basis of propagation path loss between the mobile station and a current serving base station. Propagation path loss is independent of the traffic load condition at the serving base station at any given time.

II. Signaling between the mobile and the serving base station concerning the trigger should be reduced. This avoids placing ongoing signal processing demands on either station and their system infrastructure.

The illustrated embodiment concerns a CDMA system operating with a first allocation of frequency channels (F1) and having base stations whose cells border on cells of neighboring AMPS base stations, or on cells of neighboring CDMA base stations operating with a second frequency channel allocation (F2). Those skilled in the art will understand that the disclosed invention may be adapted to initiate handoffs of mobile stations traveling between any two base station cells, or sectors of a given base station cell, whether the base stations operate with the same or different frequency channels and/or system protocols.

Figure 1:
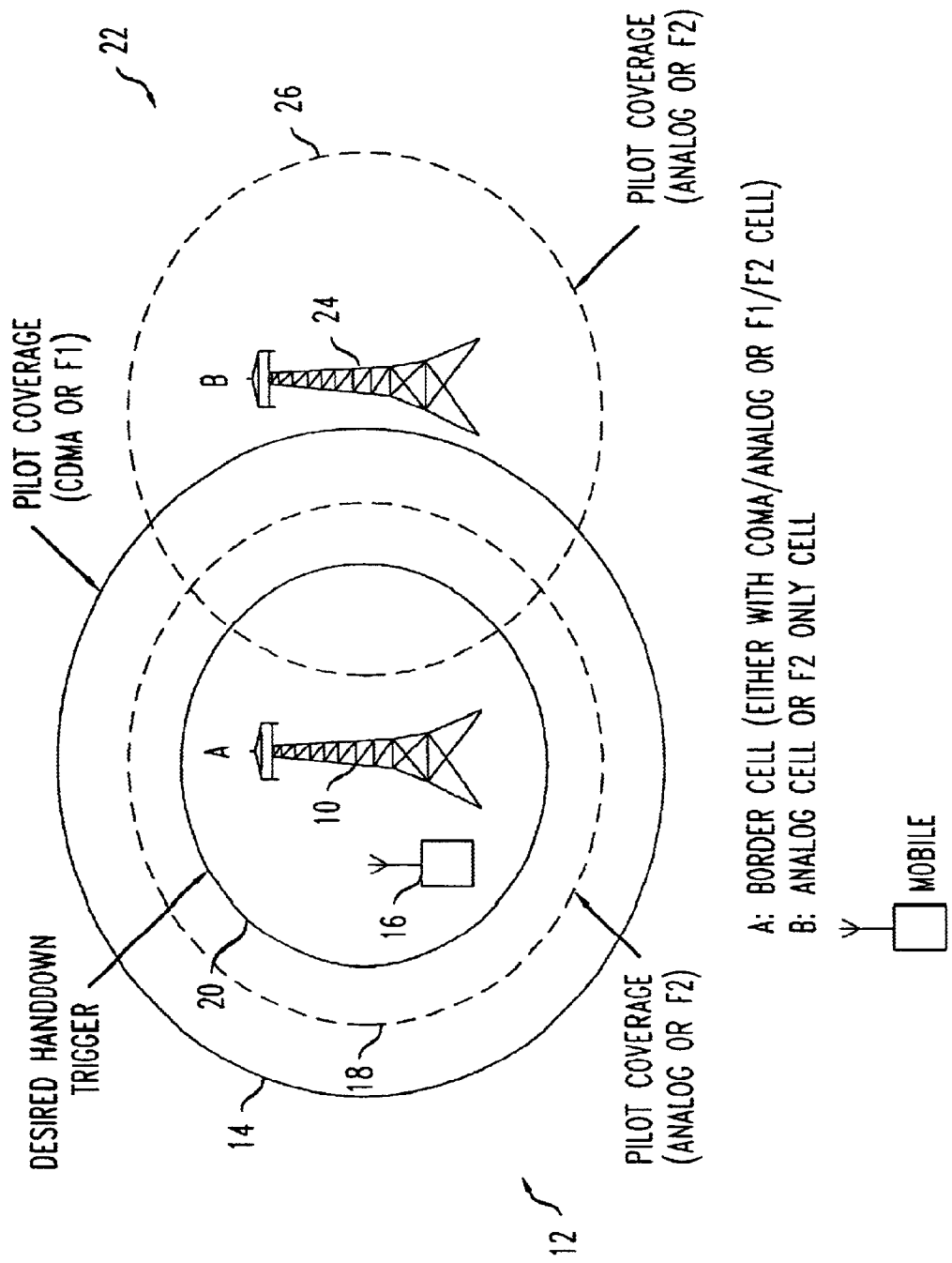
FIG. 1 shows a CDMA system base station having a cell that borders a cell of a different system base station, and a mobile station served by the CDMA base station.

FIG. 1 shows a base station 10 that is constructed and arranged to serve mobile stations within a geographic area cell A of a first cellular wireless communication system 12. In this embodiment, the base station 10 operates as part of a CDMA system with a first allocation of frequency channels (F1). Depending on the embodiment, the base station 10 can handdown from a CDMA system (F1) to an AMPS system, or to a different CDMA system (F2). In this embodiment, the base station 10 is arranged to handdown a CDMA mobile station 16 currently served by the base station 10, for continued service by the base station 10 but using signaling and/or frequency protocols of a second wireless communication system 22. For example, the system 22 may be an analog (AMPS) system having a base station 24 whose cell B borders on and partly overlaps cell A. Alternatively, base station 10 may be arranged to handdown the mobile station 16 for a different CDMA service by the base station 10, using frequency channels F2 corresponding to the second CDMA wireless communication system 22.

In the disclosed embodiment, the base station 10 is equipped to transmit a primary pilot signal corresponding to the CDMA-F1 system 12 at a set power level, so that the primary pilot signal radiates effectively to a primary pilot signal boundary 14. For example, and without limitation, a typical pilot signal may be radiated by setting a base station transmitter output power at around eight watts, and feeding the output signal to a base station antenna having a typical gain of around eight dB. The boundary 14 thus defines an outer limit for CDMA service coverage by the base station 10 using the protocols of the first communication system 12.

It will be understood that the boundary 14 is not always circular since it depends on signal path loss which typically varies for different headings from the base station, due to intervening structures and terrain.

Base station 24 in cell B is equipped to establish two-way wireless links with mobile stations inside cell B, according to the protocols of the second communication system 22. As mentioned, the second system 22 may be an "analog" one operating, for example, according to AMPS protocols, or it may be a second CDMA system using frequency channel allocations (F2) different from the first allocation (F1) of CDMA frequency channels. A boundary 26 defines a maximum limit of service area coverage by the base station 24.

Because of its proximity to cell B, base station 10 of the first system 12 is equipped to handdown service of the mobile station 16 such that the latter continues to be served by the base station 10, but according to the protocols of the second communication system 22. Alternatively, a handoff triggering procedure can also result in a hard handoff of the mobile station 16 directly to the base station 24. As explained below, the decision whether to handdown or to handoff can depend on the amount of signal path loss being experienced between the base station 10 and the mobile station 16. In this embodiment, after the handdown is performed, base station 10 serves the mobile station 16 using the same frequency channels and signaling protocols (e.g., AMPS or CDMA-F2) used by base station 24 of cell B, as far as a defined outer boundary 18 about the base station 10. Thus, boundary 18 corresponds to a handdown service area coverage for base station 10 within which it can also provide one of, e.g., AMPS service, or CDMA service using the second allocation of frequency channels (F2), depending on the nature of the bordering second wireless communication system 22.

In the disclosed embodiment, a handdown trigger (T_Handdown) is defined according to a known transmit power level of the primary pilot signal from the base station 10, and a tolerable signal propagation path loss between the base station 10 and the mobile station 16 for a desired quality of service under protocols of the first (CDMA-F1) communication system 12. For presently known CDMA systems, a tolerable path loss is typically between about 142 to 148 dB. Generally, the allowable path loss is a function of the maximum uplink signal power available from a given mobile station, as is known in the art.

In the present embodiment, the handdown trigger is initially transmitted to the mobile station using, for example, a forward traffic channel from the base station 10. The trigger is then stored by the mobile station 16. The mobile station then periodically derives a received power level of the primary (F1) pilot signal radiated from base station 10, and determines if the handdown trigger has been reached.

In FIG. 1, the tolerable path loss corresponds to a fixed distance from base station 10 thus defining a circular handdown trigger boundary 20. As explained above with respect to the pilot signal boundary 14, the trigger boundary 20 need not necessarily be circular. The trigger boundary 20 is defined on the basis of the tolerable signal propagation path loss. Forward traffic (voice) signals from the base station 10 thus may sustain the same path loss at different distances from the base station 10, depending on the heading of the mobile station relative to the base station.

As mentioned, after the mobile station 16 receives the trigger T_Handdown from the base station 10, it periodically derives the received power of the primary pilot signal radiated from base station 10. The computation may be performed, for example, by performing a conventional pilot signal strength measurement Ec/Io, and then multiplying the measured Ec/Io ratio by Io. With respect to the value of Io alone, the mobile station can, for example, periodically measure total power of signals received over the operating frequency channels of the first communication system 12, and compute an average total received signal power which average is taken as Io. If the Ec/Io and the Io measurements are each computed in terms of decibels, the results can then be added to obtain a relative received pilot signal power Ec in decibels. Alternative ways to determine these measurements are possible.

Figure 3:
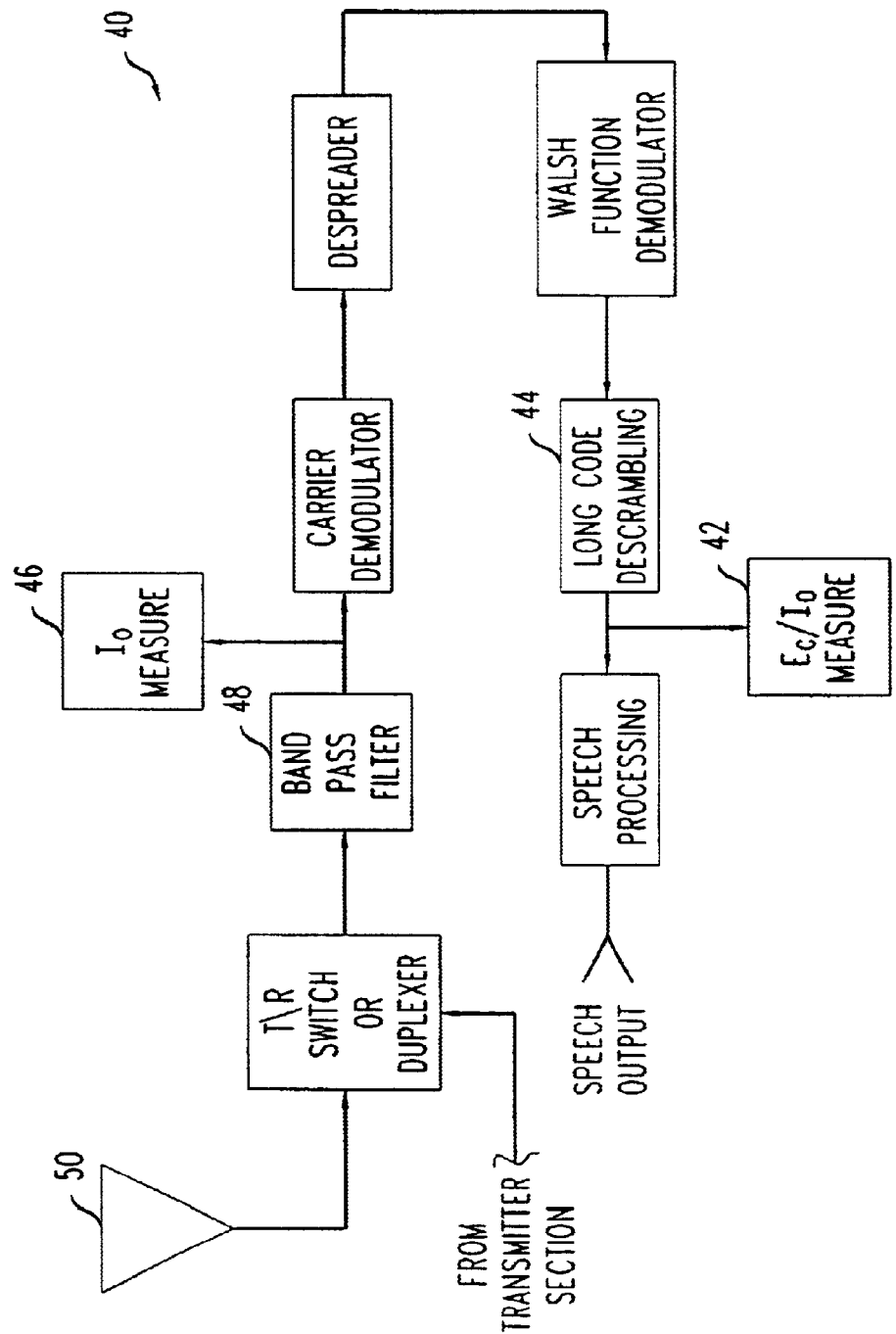
FIG. 3 is a schematic block diagram of a receiver section of the mobile station.

FIG. 3 shows a receiver section 40 of the mobile station 16. An Ec/Io ratio measurement is typically performed by circuitry 42 coupled to an output of a long code descrambling stage 44, as is known in the art. The value of Io can be measured, for example, by a power measurement circuit 46 coupled to an output of an existing receiver band pass filter 48, wherein an antenna 50 of the receiver section 40 is coupled to an input of the filter 48.

Next, mobile station 16 compares the obtained pilot signal power level Ec with T_Handdown. As long as Ec is greater then T_Handdown, no handoff related signals need be transmitted from the mobile station 16 to the base station 10. Control signaling between the two stations concerning the threshold is therefore reduced, and ongoing traffic between the stations may continue with the desired quality of service.

Figure 2:
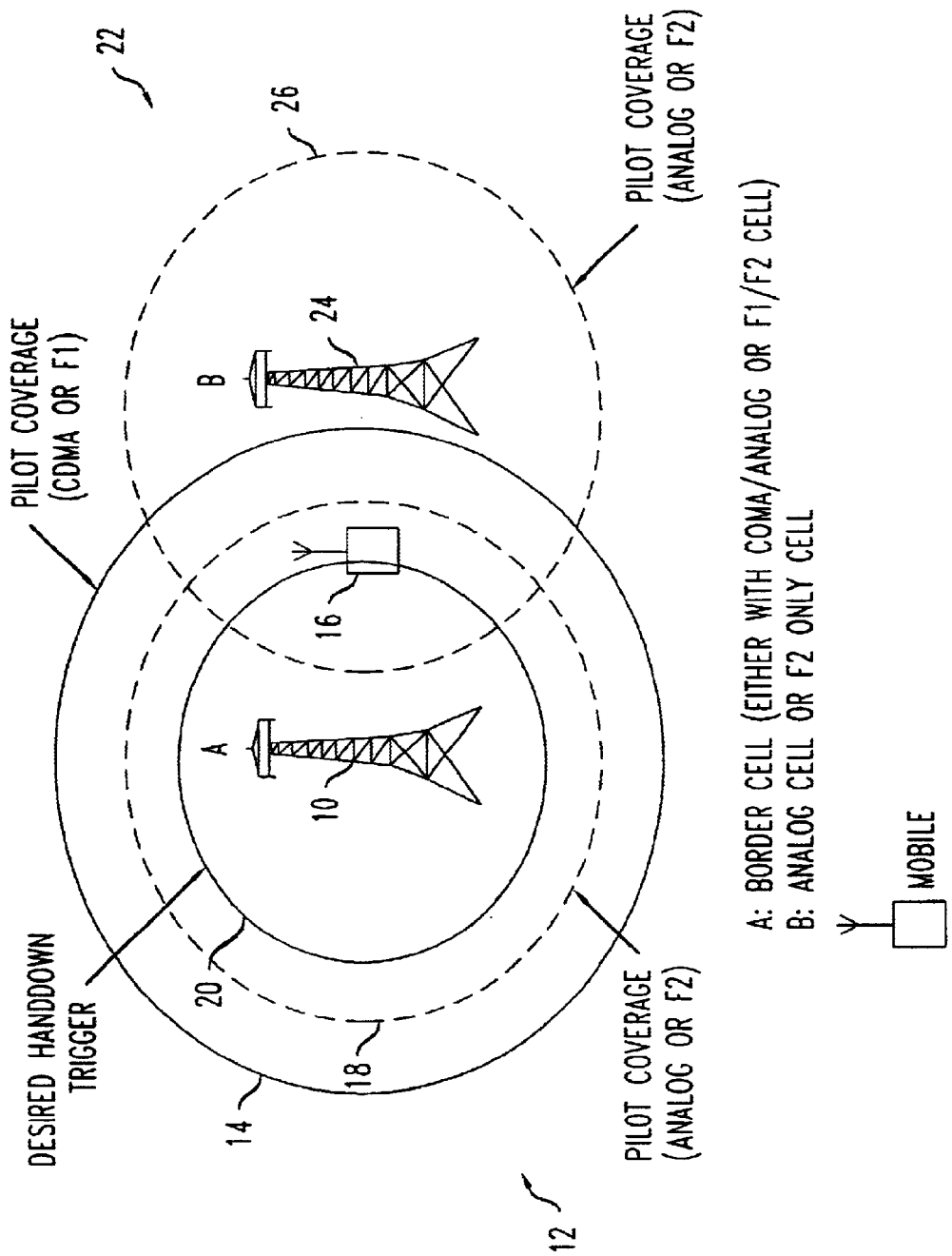
FIG. 2 shows two base stations with bordering cells as in FIG. 1, with the mobile station crossing a defined handdown trigger boundary.

In FIG. 2, the mobile station 16 is moving over the handdown trigger boundary 20 of cell A as it moves farther into cell B. When the mobile station compares Ec with T_Handdown beyond the boundary 20, Ec becomes less than T_Handdown. In this embodiment, the mobile station 16 then transmits its Ec/Io and Io measurements to the serving base station 10. The base station 10 will then typically report the measurements to the MSC with which the base station is wired. Alternative embodiments may have the mobile station transmit a derived Ec value alone to the serving base station.

Figure 4:
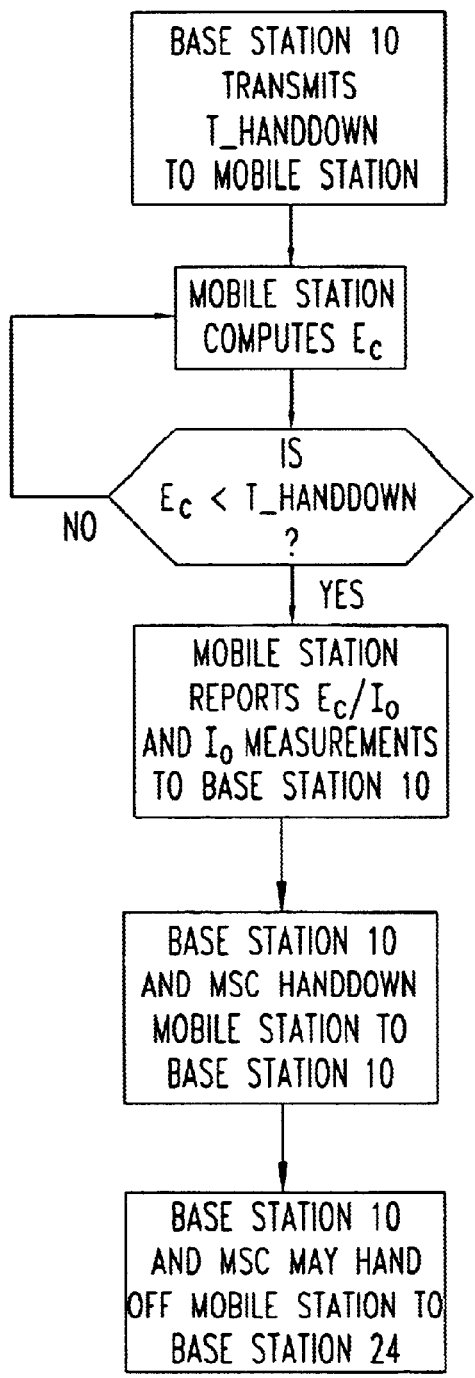
FIG. 4 is a flow diagram illustrating a hand down procedure according to the invention.

At least two scenarios may occur. See FIGS. 4 and 5. For example, in FIG. 4, the signal path loss reflected by the reported measurements is such that the mobile station 16 can be served by the base station 10 under the protocols of the second system 22, i.e., mobile station 16 is within the secondary service boundary 18 of base station 10. Thus, the mobile station is handed down for such service by the base station 10. As the mobile station continues to travel into cell B, known "soft" handoff procedures can be initiated wherein the mobile station 16 simultaneously communicates with base station 10 and base station 24 if, for example, the mobile station 16 has been handed down to a CDMA (F2) system corresponding to the second base station 24.

Assuming, for example, an allowable path loss of 145 dB, a handdown trigger is typically set to five dB less than the allowable path loss, i.e., a tolerable path loss of 140 dB. If the path loss indicated by the measurements at the mobile station is, e.g., up to three dB more than the handdown trigger (between 140 to 143 dB), a handdown of mobile station 16 to base station 10 may be appropriate.

Figure 5:
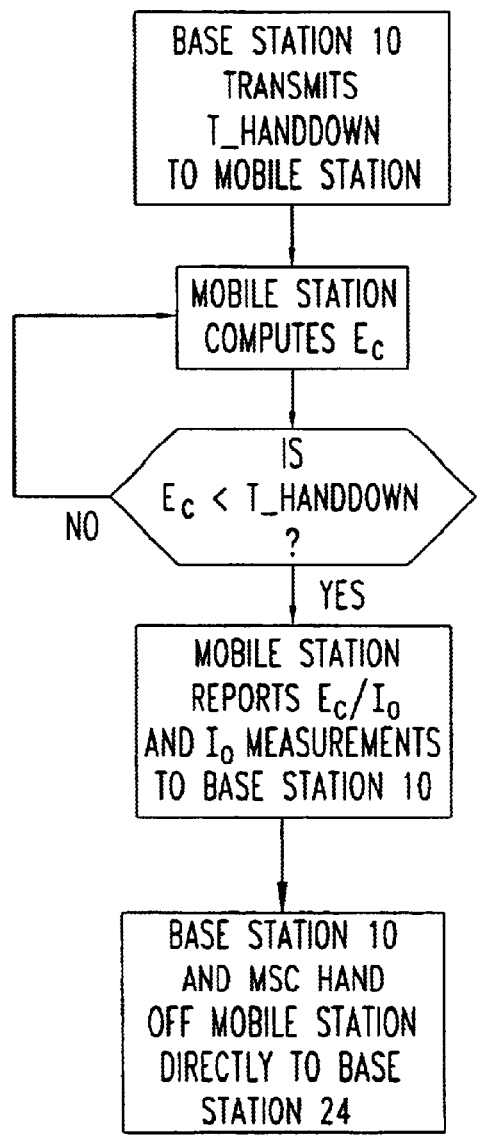
FIG. 5 is a flow diagram illustrating a handoff procedure according to the invention.

A direct or "hard" handoff to the base station 24 is represented in FIG. 5. There, the measured received Ec/Io and Io may indicate that the signal path loss is three dB or more above the handdown trigger. For example, the mobile station 16 may have traveled beyond the secondary service coverage boundary 18 of base station 10 into cell B. The mobile station is then handed off directly to the base station 24 of cell B.

As mentioned, according to one embodiment of the invention, signals representing a handdown or handoff request from a mobile station are transmitted from the mobile station only when the propagation path loss between the mobile station and its serving base station exceeds a certain level. A CDMA base station typically always monitors its transmit pilot signal power (P_pilot). The handdown trigger value T_Handdown may therefore be defined to be a threshold received pilot signal power level, such that;

T_Handdown=P_pilot−T_pathloss (all in dB);

wherein:

P_pilot=transmit pilot signal power at base station

T_pathloss=tolerable link path loss for a desired quality of service

In a CDMA system, the disclosed procedure can be implemented, for example and without limitation, by the following steps:

1. After acquiring a mobile station on a traffic channel, a serving base station sends a received pilot power threshold (PILOT_PWR_THRES) value to the mobile station.

2. The base station sends a request for periodic pilot strength measurements (Ec/Io) from the mobile station, with corresponding total received signal power measurements (Io). The mobile station is instructed to report when a strongest received pilot power computed by the mobile station as (Ec/Io)+Io, is less than PILOT_PWR_THRES.

3. After receiving one or more reports from the mobile station indicating that the received pilot signal power is less than PILOT_PWR_THRES, the base station and its associated MSC decide whether to handdown the mobile station (FIG. 4), or to handoff the mobile station directly for service by a different base station of a bordering cell (FIG. 5).

An example of how current systems can be adapted to use path loss to trigger a handdown or handoff is as follows:

1. Define a new periodic Pilot Strength Measurement Request Order with ORDER code='010001', ORDQ= nnnnnnnn (where nnnnnnnn specifies the report period), and one Order Specific field to specify the pilot signal power threshold (PILOT_PWR_THRES).

2. After acquiring a mobile station on a traffic channel, a serving base station sends the new Order to request periodic pilot strength measurements from the mobile station, specifying the report interval and the condition under which the mobile station is to report the measurements.

3. The mobile station periodically transmits a pilot Strength Measurement Message (PSMM) and, in addition, a total serving frequency signal power value (SF_RX_PWR) to the base station when a strongest received pilot power derived as (Ec/Io) (dB)+Io(dBm) is less than PILOT_PWR_THRES. Thus, the newly defined PSMM may be considered as an extension of the PSMM used in a current IS-95 standard.

While the foregoing description represents a preferred embodiment of the invention, it will be obvious to those skilled in the art that various changes and modifications may be made, without departing from the spirit and scope of the invention pointed out by the following claims. For example, the mobile station may transmit periodic pilot strength measurements (Ec/Io) with corresponding total received signal power measurements (Io) to the base station, autonomously. The base station can then calculate the power level of the control signal received at the mobile station, and determine when the received signal power level is less than the threshold power level.

We claim:

1. A method of providing a trigger for a mobile station served by a base station of a cellular wireless communication system, comprising:

receiving a control signal from the base station;

producing a control signal strength measurement which is a function of control signal power and total received signal power and a total received signal power measurement;

deriving a control signal power level using said control signal strength measurement and said total received signal power measurement; and comparing said control signal power level to a control signal power level threshold.

2. The method of claim 1, wherein said step of receiving comprises receiving a pilot signal as the control signal from said base station operating as part of a code division multiple access CDMA) system.

3. The method of claim 1, including receiving the control signal power level threshold from the base station.

4. The method of claim 1, further includes transmitting signal measurements from the mobile station to said base station depending on the results of said comparison between said control signal power level and the control signal power level threshold.

5. The method of claim 4, wherein the steps of deriving and comparing are carried out by the base station.

6. The method of claim 4, wherein the steps of deriving and comparing are carried out by the mobile station.

7. The method of claim 4, including handing down the mobile station for service by the base station using system protocols of a wireless communication system having a cell that borders on the cell of the base station.

8. The method of claim 4, including handing off the mobile station for service by a different base station having an associated cell that borders on the cell of the base station.

9. The method of claim 8, including handing down the mobile station for service by the base station using system protocols of a wireless communication system having a cell that borders on the cell of the base station, before handing off the mobile station for service by said different base station.

10. The method of claim 1, including maintaining a transmit power level of the control signal substantially independent of traffic loading at the base station.

11. The method of claim 1, wherein the step of producing includes measuring as said control signal strength measurement a ratio of said control signal power divided by said total received signal power.

12. The method of claim 11, wherein the step of deriving includes multiplying said control signal strength measurement by said total received signal power measurement.

13. The method of claim 1 further including transmitting control signal strength and total received power measurements from the mobile station to said base station depending on the results of a comparison between said control signal power level and said control power level threshold.

14. A method of providing a trigger for a mobile station served by a base station of a cellular wireless communication system, comprising:

radiating a control signal; and receiving signal measurements from said mobile station after a control signal power level is derived using a total received signal power measurement and a control signal strength measurement which is a function of control signal power and total received signal power and the control signal power level is compared with a control signal power level threshold.

15. The method of claim 14, wherein the step of radiating comprises radiating a pilot signal as the control signal from the base station as part of a code division multiple access CDMA) system.

16. The method of claim 14 comprises transmitting the control signal power level threshold from the base station to the mobile station.

17. The method of claim 14, wherein the control signal power level is derived and compared to said control signal power level threshold at said mobile station.

18. The method of claim 14, wherein the step of receiving includes measuring at said mobile station as said control signal strength measurement a ratio of said control signal power divided by said total received signal power.

19. The method of claim 14, wherein said step of receiving includes multiplying at said mobile station said control signal strength measurement by said total received signal power measurement to derive said control signal power level.

20. The method of claim 13 further including receiving as said signal measurements a control signal strength measurement and a total received power measurement from said mobile station depending on the results of said comparison between said control signal power level and said control power level threshold.

21. A method of receiving measurements for a mobile station by a serving base station currently serving said mobile station in a cellular wireless communication system, comprising:

radiating a control signal from the base station; and receiving by said serving base station from said mobile station a control signal strength measurement Ec/Io of said control signal and a total received signal power measurement which is made at said mobile station separate from said control signal strength measurement Ec/Io which is made at said mobile station, said control signal strength measurement Ec/Io is a function of control signal power Ec and total received signal power Io.

22. The method of claim 21 further comprising the steps of:

transmitting to said mobile station a control signal power level threshold; and wherein said receiving occurring after said mobile station derives a control signal power level as a function of said control signal strength measurement Ec/Io and said total received signal power measurement which can be taken as Io and determines that said control signal power level is less than said control signal power level threshold.

23. The method of claim 22, wherein said mobile station derives said control signal power level by multiplying said control signal strength measurement Ec/Io by said total received signal power measurement.

24. A method of providing measurements from a mobile station to a serving base station currently serving said mobile station in a cellular wireless communication system, comprising:

receiving a control signal that is radiated from said serving base station;

transmitting to said serving base station a control signal strength measurement Ec/Io of said control signal and a total received signal power measurement which is made at said mobile station separate from said control signal strength measurement Ec/Io which is made at said mobile station, said control signal strength measurement Ec/Io is a function of control signal power Ec and total received signal power Io.

25. The method of claim 24 comprising:

receiving a control signal power level threshold from said serving base station;

deriving a control signal power level as a function of said control signal strength measurement Ec/Io and said total received signal power measurement which can be taken as Io; and determining that the control signal power level is less than the control signal power level threshold.

26. The method of claim 25, wherein said deriving said control signal power level includes multiplying said control signal strength measurement Ec/Io by said total received signal power measurement.

27. A method of triggering a handdown or a handoff of a mobile station served by a base station of a cellular wireless communication system, comprising:

radiating a control signal from the base station;

determining a control signal power level threshold as a function of a tolerable path loss of a signal link between said base station and said mobile station; and triggering a handdown or a handoff of the mobile station after a control signal power level is determined using a control signal strength measurement which is a function of control signal power and total received signal power and a total received signal power measurement and the control signal power level is compared to said control signal power level threshold.

28. The method of claim 27, including transmitting the control signal power level threshold to the mobile station.

29. The method of claim 27, wherein the triggering step includes receiving, at the base station, signal measurements from the mobile station to said base station depending on the results of said comparison between said control signal power level and the control signal power level threshold.

30. A method of triggering a handdown or a handoff of a mobile station served by a base station of a cellular wireless communication system, comprising:

receiving, at a mobile station, a control signal that is radiated from a serving base station;

receiving, at the mobile station, a control signal power level threshold as a function of a tolerable path loss for signal links between the base station and the mobile station; and triggering a handoff or handdown of the mobile station after determining a control signal power level using a control signal strength measurement which is a function of control signal power and total received signal power and a total received signal power measurement and comparing the control signal power level with said control signal power level threshold.

31. The method of claim 30, wherein the triggering includes transmitting signal measurements from the mobile station to said base station.

32. A method of providing measurements between a mobile station and a base station of a cellular wireless communication system, comprising:

receiving a control signal that is radiated from said base station;

performing a total received signal power measurement which is made at said mobile station separate from a control signal strength measurement Ec/Io of said control signal made at said mobile station, said control signal strength measurement Ec/Io is a function of control signal power Ec and total received signal power Io;

deriving a control signal power level as a function of said control signal strength measurement Ec/Io and said total received signal power measurement which can be taken as Io; and comparing said control signal power level with a control signal power level threshold.

33. The method of claim 32 further including the step of:

transmitting said control signal power level to said serving base station.

34. A method of receiving measurements for a mobile station to a base station of a cellular wireless communication system, comprising:

radiating a control signal from the base station; and receiving signal measurements from said mobile station after said mobile station compares a control signal power level threshold with a control signal power level derived at said mobile station as a function of a control signal strength measurement Ec/Io and a total received signal power measurement which can be taken as Io, said total received signal power measurement is made at said mobile station separate from said control signal strength measurement Ec/Io of said control signal made at said mobile station, said control signal strength measurement Ec/Io is a function of control signal power Ec and total received signal power Io.

* * * * *